(12) United States Patent
Nishikawa et al.

(10) Patent No.: US 9,663,187 B2
(45) Date of Patent: May 30, 2017

(54) BICYCLE CONTROL APPARATUS

(71) Applicant: Shimano Inc., Sakai, Osaka (JP)

(72) Inventors: Yusuke Nishikawa, Osaka (JP);
Yasuhiro Tsuchizawa, Osaka (JP);
Makoto Usui, Osaka (JP); Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/946,001

(22) Filed: Nov. 19, 2015

(65) Prior Publication Data
US 2016/0159433 A1 Jun. 9, 2016

(30) Foreign Application Priority Data

Dec. 5, 2014 (JP) .................................. 2014-247319
Jul. 24, 2015 (JP) .................................. 2015-147177

(51) Int. Cl.
| | |
|---|---|
| B62M 6/50 | (2010.01) |
| B62M 25/04 | (2006.01) |
| G01D 5/14 | (2006.01) |
| G01D 5/34 | (2006.01) |
| B62K 11/00 | (2006.01) |

(52) U.S. Cl.
CPC ............... B62M 6/50 (2013.01); B62K 11/00 (2013.01); B62M 25/04 (2013.01); G01D 5/145 (2013.01); G01D 5/34 (2013.01)

(58) Field of Classification Search
CPC ......... B62M 6/50; B62M 25/04; B62K 11/00; G01D 5/145; G01D 5/34
See application file for complete search history.

(56) References Cited

U.S. PATENT DOCUMENTS

| | | | |
|---|---|---|---|
| 6,247,548 B1 * | 6/2001 | Hayashi | B60L 11/1801 180/206.2 |
| 8,286,529 B2 | 10/2012 | Tetsuka | |
| 9,056,651 B2 | 6/2015 | Tetsuka | |
| 9,090,304 B2 | 7/2015 | Tetsuka | |
| 2013/0054066 A1 * | 2/2013 | Watarai | B62M 6/45 701/22 |
| 2014/0298943 A1 | 10/2014 | Hashimoto | |

* cited by examiner

Primary Examiner — Behrang Badii
Assistant Examiner — Daniel L Greene
(74) Attorney, Agent, or Firm — Global IP Counselors, LLP

(57) ABSTRACT

A bicycle control apparatus is provided with a controller for controlling an output of an assist motor according to a manual drive force. The controller is configured to selectively set a first control state and a second control state, in which output states of the assist motor with respect to the manual drive force are different from each other. The controller controls the output of the assist motor so that a response speed of the assist motor with respect to changes in the manual drive force in the first control state will be faster than the response speed of the assist motor with respect to changes in the manual drive force in the second control state, when a crank of a bicycle is rotated from a stopped state and/or when a rotational speed of the crank is less than or equal to a prescribed first speed.

12 Claims, 6 Drawing Sheets

BICYCLE CONTROL APPARATUS

CROSS-REFERENCE TO RELATED APPLICATIONS

This application claims priority to Japanese Patent Application No. 2014-247319, filed on Dec. 5, 2014 and Japanese Patent Application No. 2015-147177, filed on Jul. 24, 2015. The entire disclosures of Japanese Patent Application Nos. 2014-247319 and 2015-147177 are hereby incorporated herein by reference.

BACKGROUND

Field of the Invention

This invention generally relates to a bicycle control apparatus.

Background Information

A bicycle control apparatus is known that comprises a controller for controlling the output of an assist motor in response to a manual drive force. For example, one conventional bicycle control apparatus is disclosed in Japanese Laid-Open Patent Publication No. 2001-10581). This bicycle control apparatus determines a running assist force for running assist according to a manual drive force.

A bicycle detector is conventionally known for detecting the movement of a plurality of bicycle operating devices. One example of a bicycle detector is disclosed in U.S. Pat. No. 8,286,529 in which an operating device is provided to of a transmission comprising two operating members and comprises two sensors for detecting the operation of each operating member.

SUMMARY

Generally, the present disclosure is directed to various features of a bicycle control apparatus that is used to control an operation a bicycle component.

Basically, the demand for the assist motor differs depending on the traveling conditions of the bicycle. For example, the demand for the assist motor differs between when the bicycle is traveling on-road and when traveling off-road. For this reason, a control for the assist motor that corresponds to the traveling conditions of the bicycle is preferred.

One object of the present invention is to provide a bicycle control apparatus that is capable of controlling an assist motor according to the traveling conditions of a bicycle.

In view of the state of the known technology and in accordance with a first aspect of the present disclosure, a bicycle control apparatus is provided that basically comprises a controller for controlling an output of an assist motor according to a manual drive force, wherein the controller is configured to selectively set a first control state and a second control state, in which output states of the assist motor with respect to the manual drive force are different from each other; the controller controls the output of the assist motor so that a response speed of the assist motor with respect to changes in the manual drive force in the first control state will be faster than the response speed of the assist motor with respect to changes in the manual drive force in the second control state, when a crank of a bicycle is rotated from a stopped state and/or when a rotational speed of the crank is less than or equal to a prescribed first speed.

In accordance with a second aspect of the present invention, the bicycle control apparatus is configured so that the controller controls the output of the assist motor so that the response speed of the assist motor when the manual drive force is increased in the first control state will be faster than the response speed of the assist motor when the manual drive force is increased in the second control state, when the bicycle crank is rotated from a stopped state.

In accordance with a third aspect of the present invention, the bicycle control apparatus is configured so that the controller controls the output of the assist motor so that the response speed of the assist motor when the manual drive force is decreased in the first control state will be faster than the response speed of the assist motor when the manual drive force is decreased in the second control state, when the rotational speed of the crank is less than or equal to a prescribed first speed.

In accordance with a fourth aspect of the present invention, the bicycle control apparatus is configured so that the controller controls the output of the assist motor so that the response speed of the assist motor when the manual drive force is decreased in the first control state will be slower than the response speed of the assist motor when the manual drive force is decreased in the second control state, when the rotational speed of the crank exceeds a prescribed second speed, which is greater than or equal to a prescribed first speed.

In accordance with a fifth aspect of the present invention, the bicycle control apparatus further comprises an operating unit that can be attached to a bicycle, wherein the controller selectively sets the first control state and the second control state with the operating unit.

In accordance with a sixth aspect of the present invention, the bicycle control apparatus further comprises a communication unit that is configured to communicate with an external apparatus, wherein the controller selectively sets the first control state and the second control state with the external apparatus.

In accordance with a seventh aspect of the present invention, the bicycle control apparatus is configured so that the controller can adjust the response speed with the operating unit.

In accordance with an eighth aspect of the present invention, the bicycle control apparatus according to the seventh aspect is configured so that the controller can adjust the response speed with the external apparatus.

In accordance with a ninth aspect of the present invention, a bicycle control apparatus is provided that comprises a controller for controlling an output of an assist motor according to a manual drive force, wherein the controller is configured to selectively set a first control state and a second control state, in which the maximum values of the output of the assist motor with respect to the manual drive force are the same, and in which the output states of the assist motor with respect to the manual drive force are different from each other; the controller controls the output of the assist motor so that the output of the assist motor with respect to the manual drive force in the first control state will be different from the output of the assist motor with respect to the manual drive force in the second control state, when a crank of a bicycle is rotated from a stopped state and/or when the rotational speed of the crank is less than or equal to a prescribed first speed.

In accordance with a tenth aspect of the present invention, the bicycle control apparatus is configured so that the controller reduces the output of the assist motor until a rotational angle of the crank reaches a first prescribed value when the crank is rotated from a stopped state in the first control state; the output of the assist motor is reduced until the rotational angle of the crank reaches a second prescribed value, which is greater than the first prescribed value, when the crank is rotated from a stopped state in the second control state.

In accordance with an eleventh aspect of the present invention, a bicycle control apparatus is provided that controls a bicycle that has an assist motor and that comprises a controller for controlling the running assist force that the assist motor outputs according to at least either the rotational angle of the crank, based on a position of the bicycle crank at a point in time in which the running assist is initiated by the assist motor; a travel distance from the point in time in which the running assist is initiated; or a travel time from the point in time at which the running assist is initiated, wherein the controller is configured to selectively set a first control state and a second control state in which the outputs of the assist motor with respect to the manual drive force are different from each other; the controller differentiates the running assist force that the assist motor outputs in the first control state and the running assist force that the assist motor outputs in the second control state.

In accordance with a twelfth aspect of the present invention, a bicycle control apparatus is provided that controls a bicycle that has an assist motor and that comprises a controller for controlling the running assist force that the assist motor outputs according to the manual drive force, wherein the controller controls the running assist force so that a reduction in the running assist force with respect to a reduction in the manual drive force is delayed when the manual drive force is decreased, and controls the delay in the reduction of the running assist force according to a rotation state of a crank; the controller is configured to selectively set a first control state and a second control state in which outputs of the assist motor with respect to the manual drive force are different from each other, and the controller differentiates the delay in the reduction of the running assist force in the first control state and the delay in the reduction of the running assist force in the second control state.

In the present disclosure, the bicycle control apparatus of the present invention is configured to control the assist motor that corresponds to the traveling conditions of the bicycle.

Also other objects, features, aspects and advantages of the disclosed bicycle control apparatus that is used to operate a bicycle component will become apparent to those skilled in the art from the following detailed description, which, taken in conjunction with the annexed drawings, discloses a preferred embodiment of the bicycle control apparatus.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
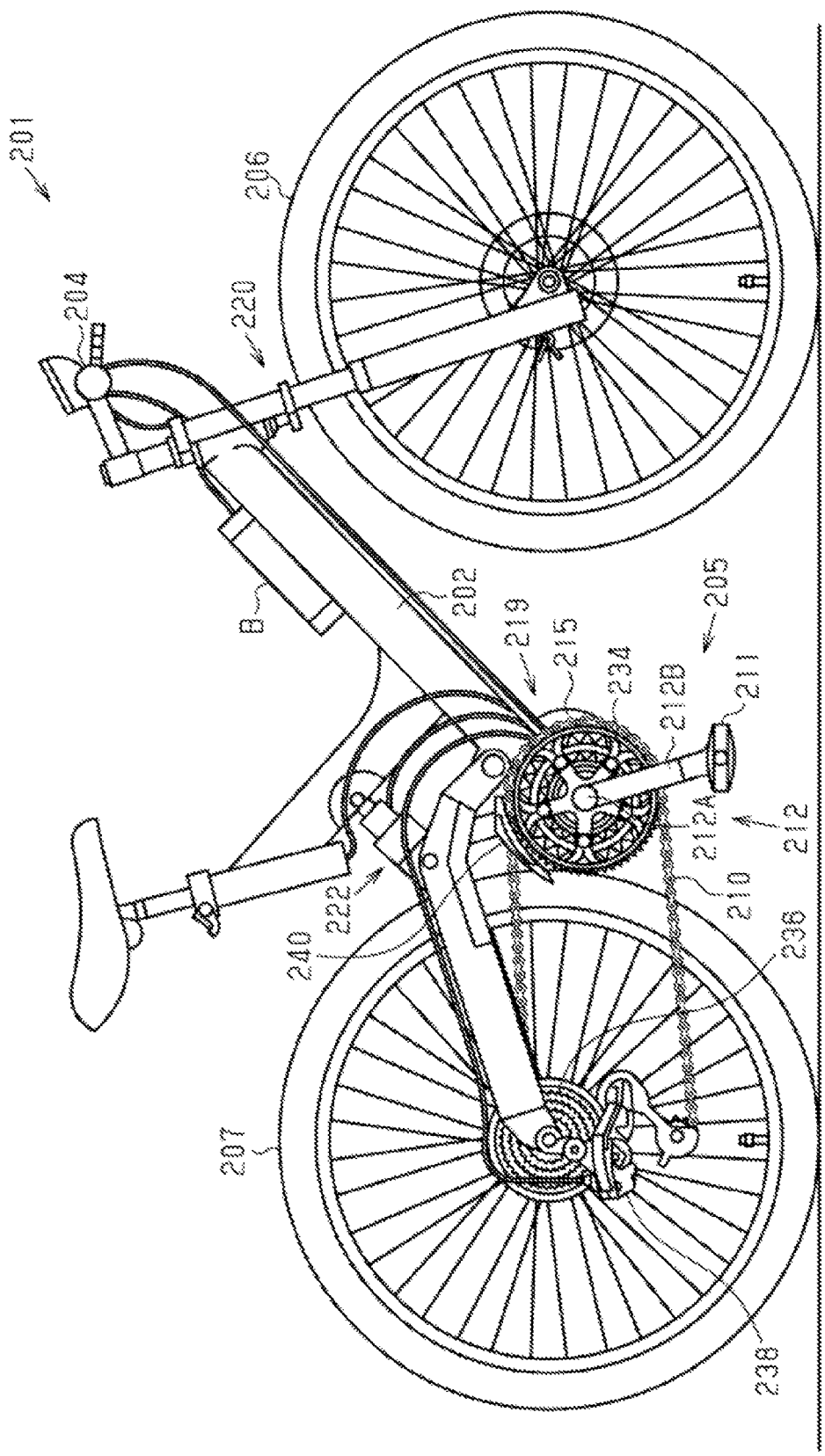
FIG. 1 is a side elevational view of a bicycle that is equipped with a bicycle control apparatus in accordance with one illustrative embodiment.

Referring initially to FIG. 1, a bicycle 201 is illustrated that is equipped with a bicycle control apparatus in accordance with an illustrated embodiment.

Referring now to FIG. 1, a side elevational view of a bicycle 201 is illustrated which is equipped with a bicycle control apparatus 1 in accordance with a fifth embodiment. As shown in FIG. 1, the bicycle 201 comprises a frame 202, a handlebar 204, a drive unit 205, a front wheel 206 and a rear wheel 207. In the present embodiment, the bicycle 201 is a mountain bike comprising a front suspension 220 and a rear suspension 222 on the frame 202. However, the bicycle control apparatus 1 can also be used with a bicycle that does not have a front and/or rear suspension.

The drive unit 205 comprises a chain 210, a pair of pedals 211, a crank 212, an assist mechanism 215 and a detachable rechargeable battery B. Each of these is supported by the frame 202. The pedals 211 are attached to the crank 212. The detachable rechargeable battery B serves as a power source for the assist mechanism 215. The crank 212 comprises a crank axle 212A and a pair of crank arms 212B. Each crank arm 212B is provided to the two ends of the crank axle 212A. The drive unit 205 further comprises a plurality of front sprockets 234. The front sprockets 234 are directly or indirectly connected to the crank 212. The rear wheel 207 includes a plurality of rear sprockets 236. The chain 210 is wrapped around between one of the front sprockets 234 and one of the rear sprockets 236 to transmit the drive force. The rechargeable battery B is detachably mounted to the frame 202. The rechargeable battery B is a storage battery that includes, for example, a nickel hydride cell or a lithium ion cell.

The drive unit 205 comprises a front transmission mechanism 238 and a rear transmission mechanism 240. The front transmission mechanism 238 switches the chain 210 among the front sprockets 234. The rear transmission mechanism 240 switches the chain 210 among the rear sprockets 236. The front transmission mechanism 238 and the rear transmission mechanism 240 are each controlled by a gear changing control apparatus (not shown in the drawings) that is provided to the handlebar 204. The front sprocket 234 can be configured by one of these, in which case the front transmission mechanism 238 is omitted.

Figure 2:
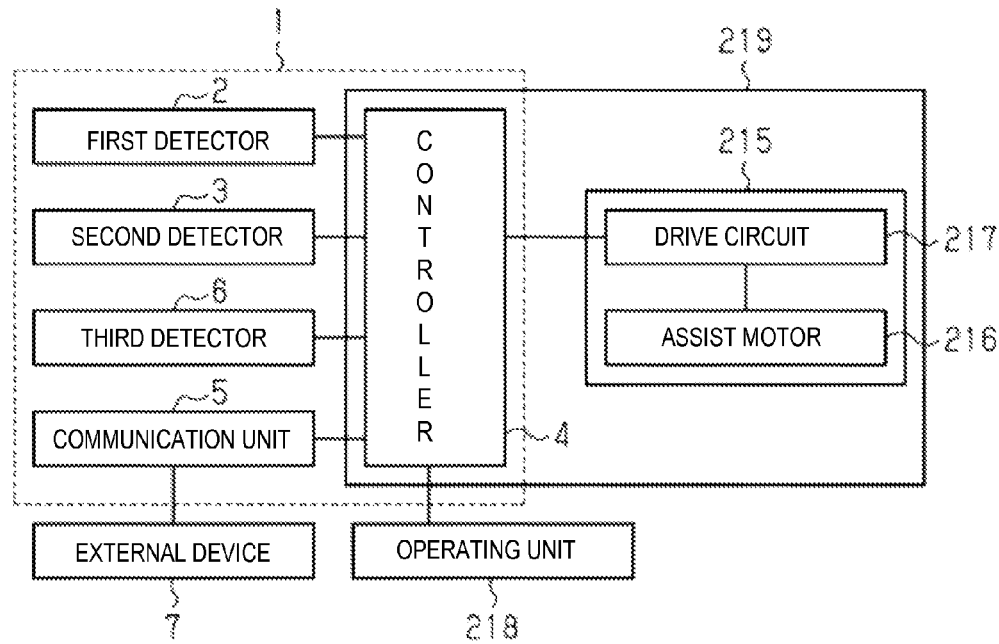
FIG. 2 is a simplified block diagram showing the configuration of the bicycle control apparatus illustrated in FIG. 1.

FIG. 2 is a block diagram that depicts the bicycle control apparatus 1. As shown in FIG. 2, the bicycle control apparatus 1 comprises a first detector 2, a second detector 3, a controller 4, a communication unit 5, and a third detector 6.

An operating unit 218 and an assist mechanism 215 are connected to this bicycle control apparatus 1. The first detector 2, the second detector 3, the communication unit 5, and the third detector 6 are electrically connected to the controller 4.

The operating unit 218 is mounted to the handlebar 204 (see FIG. 1). The operating unit 218 is provided to the bicycle 201, as shown in FIG. 1. The operating unit 218 shown in FIG. 2 is electrically connected by wire or is wirelessly connected to the controller 4 of the bicycle control apparatus 1. With the operation of this operating section 218, an assist condition is selected by the assist mechanism 215. The operating unit 218 comprises, for example, an operating switch. For instance, by operating the operating unit 218, one assist condition can be selected from among a first assist condition, a second assist condition, and a third assist condition. Changing the size of the running assist force PX with respect to manual drive force is possible by changing a plurality of assist conditions. Meanwhile, the details of each assist condition will be described later.

The assist mechanism 215 comprises an assist motor 216 and a drive circuit 217. The assist motor 216 is controlled by a drive circuit 217. Additionally, the drive circuit 217 controls the assist motor 216 based on a command from the controller 4. The assist motor 216 is coupled to a power transmission path comprising a crankshaft 212A that is provided between the crank arms 212B and the front sprocket 234, as shown in FIG. 1. The assist mechanism 215 can be configured to comprise a reduction gear, which is not shown, and to transmit the output of the assist motor 216 to the power transmission path via the reduction gear. As shown in FIG. 2, the drive unit 219 is configured to comprise the controller 4 of the bicycle control apparatus 1 and the assist mechanism 215. The drive unit 219 is detachably provided to the frame 202 (see FIG. 1).

The first detector 2 shown in FIG. 2 detects a manual drive force. Specifically, the first detector 2 outputs a signal corresponding to the manual drive force. For example, the first detector 2 is a torque sensor, which outputs a signal (for example, voltage) corresponding to the torque acting on a power transmission path comprising a crankshaft 212A of a crank 212, as shown in FIG. 1, or a crankshaft 212A that is provided between a crank arm 212B and the front sprocket 234. For example, the torque sensor can be a magnetostrictive sensor or a strain gauge. The first detector 2 shown in FIG. 2 sends information regarding the detected manual drive force to the controller 4.

The second detector 3 detects the rotational state of the crank 212. The rotational state of the crank 212 includes the rotational angle TA of the crank 212. Here, the rotational angle TA of the crank 212 refers to the rotational angle at which the reference is the position of the crank 112 at a point in time when the assist motor 216 has started running the assist (see FIG. 2). The rotational angle TA can be rephrased as the total amount of rotation of the crank 212 from the point in time that running assist has started. The second detector 3 can detect the rotational angle of the crankshaft 212A or the rotational angle of the crank arm 212B as the rotational angle TA of the crank 212. The second detector 3 shown in FIG. 2 sends information regarding the detected rotational angle TA to the controller 4.

Additionally, the rotational state of the crank 212 includes the rotational speed KA of the crank 212. The second detector 3 shown in FIG. 2 functions as a cadence sensor and detects the cadence of the crank 212 (see FIG. 1) as the rotational speed KA. The second detector 3 can also detect the rotation period of the crank 212 (see FIG. 1) as the rotational state. The second detector 3 sends information regarding the detected cadence to the controller 4.

For example, the second detector 3 includes a rotary encoder and detects the rotational angle TA of the crankshaft 212A (see FIG. 1) by detecting a change in the magnetic flux density of a multipolar magnet attached to the crankshaft 212A (see FIG. 1) by using a Hall element. The second detector 3 can detect the rotational speed KA of the crankshaft 212A (see FIG. 2) based on the rotational angle TA of the crankshaft 212A (see FIG. 1) and the time. The second detector 3 can be formed of a magnet that is provided to the crankshaft 212A (see FIG. 1) or the crank arm 212B (see FIG. 1). A reed switch is provided that detects this magnet, detects the rotational speed KA of the crankshaft 212A (see FIG. 1). The second detector 3 can be an optical encoder, instead of a magnetic encoder, and can be made a rotational angle sensor other than a rotary encoder.

The third detector 6 detects a traveling speed of the bicycle 201. The third detector 6, for example, includes a reed switch that detects a magnet that is provided to the rear wheel 207 (see FIG. 1). The controller 4 calculates the traveling speed ZA of the bicycle 201 based on the detected value of the third detector 6 and the tire diameter.

The controller 4 causes the assist motor 216 to execute the running of the assist when a prescribed condition has been met. For example, the controller 4 causes the assist motor 216 to execute the running of the assist when a determination is made that the manual drive force (the torque) that is detected by the first detector 2 is equal to or greater than a manual drive force reference value, which is set in advance. The controller 4 reduces or stops the output of the assist motor 216 when the traveling speed ZA detected by the third detector 6 becomes equal to or greater than a prescribed speed. The prescribed speed corresponds to, for example, 25 km per hour.

The controller 4 controls the running assist force PX to be output by the assist motor 216 according to the manual drive force detected by the first detector 2, the rotational angle TA, which is the detection result detected by the second detector 3, and the traveling speed ZA, which is the detection result detected by the third detector 6. Specifically, the controller 4 causes the assist motor 216 to output a running assist force PX that is less than or equal to a base running assist force that is set according to the manual drive force. The controller 4 comprises, for example, a microcomputer and comprises a CPU (Central processing unit), RAM (random access memory), ROM (read only memory), I/O interface, and the like. Thus, the controller 4 includes at least one processor and at least one memory device with the control programs stored therein.

Next, the base running assist force PA, which is set according to the manual drive force, will be explained.

For example, if the first assisting condition is selected by the operating unit 218, the controller 4 sets a running assist force PX that is X times the manual drive force as the base running assist force PA. In the first assisting condition, the controller 4 controls the assist mechanism 215 so that a torque that is X times the torque that acts on the power transmission path from the manual drive force is supplied from the assist mechanism 215 to the power transmission path.

For example, if the second assisting condition is selected by the operating unit 218, the controller 4 sets a running assist force PX that is Y times the manual drive force as the base running assist force PA. In the second assisting condition, the controller 4 controls the assist mechanism 215 so that a torque that is Y times the torque that acts on the power transmission path from the manual drive force is supplied from the assist mechanism 215 to the power transmission path.

For example, if the third assisting condition is selected by the operating unit 218, the controller 4 sets a running assist force PX that is Z times the manual drive force as the base running assist force PA. In the third assisting condition, the controller 4 controls the assist mechanism 215 so that a torque that is Z times the torque that acts on the power transmission path from the manual drive force is supplied from the assist mechanism 215 to the power transmission path. Numbers for X, Y, and Z are selected so that X>Y>Z. For example, X=2, Y=1.5, and Z=1 are selected. Meanwhile, an OFF mode where assisting is not done by the assist mechanism 215 can also be selected by the control section 218.

Next, a method in which the controller 4 is programmed to set the running assist force PX that is less than or equal to the base running assist force PA described above will be explained. When the bicycle crank 212 is rotated from a stopped state, the controller 4 corrects the base running assist force PA described above, according to a rotational angle TA detected by the second detector 3. This corrected base running assist force PA is the running assist force PX that the assist motor 216 is made to output. The controller 4 controls the drive circuit 217 and causes the assist motor 216 to output this running assist force PX.

When the crank 212 is rotated from a stopped state, the controller 4 corrects the base running assist force PA so that the running assist force PX becomes closer to the base running assist force PA as the rotational angle TA increases. More specifically, when the crank 212 is rotated from a stopped state, the controller 4 corrects the base running assist force PA based on correction information corresponding to the rotational angle TA. This correction information is represented by a correction coefficient that increases as the rotational angle TA increases. The controller 4 calculates the running assist force PX by multiplying this correction coefficient by the base running assist force.

Figure 3:
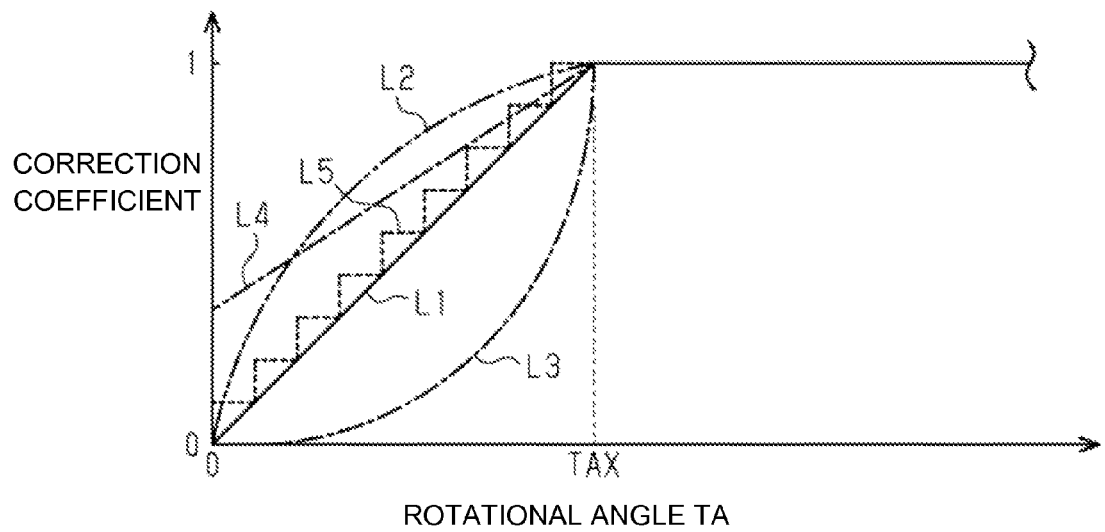
FIG. 3 is a correction coefficient map showing an association between a correction coefficient and a rotational angle.

For example, the controller 4 stores a correction information map, such as that shown in FIG. 3, and sets the correction coefficient based on this correction information map. Meanwhile, the correction information map includes information that correlates the rotational angle TA and the correction coefficient, and the correction coefficient increases as the rotational angle TA increases. While not particularly limited, the correction coefficient is equal to or greater than 0 and less than or equal to 1.

The controller 4 sets the correction coefficient to 1 when the rotational angle TA that is detected by the second detector 3 becomes equal to or greater than a prescribed threshold value TAX. The controller 4 carries out an operation to correct the running assist force PX when the manual drive force is reduced, as described below (hereinafter referred to as the second correction operation), after carrying out an operation to correct the running assist force PX based on the rotational angle TA of the crank 212 (hereinafter referred to as the first correction operation). For example, the threshold value TAX is preferably equal to or greater than 0 degrees and less than or equal to 1000 degrees; more preferably, this is equal to or greater than 20 degrees and less than or equal to 800 degrees. The controller 4 can also calculate a correction coefficient corresponding to the rotational angle TA with a formula set in advance, instead of using such a correction information map. As the value of the threshold value TAX decreases, the response speed of the assist motor 216 when starting to pedal the bicycle 201 from a state in which the crank 212 is stopped increases. That is, the time needed for the output of the assist motor 216 to reach the base running assist force PA becomes shorter. If the threshold value TAX is decreased, the output of the assist motor 216 with respect to the manual drive force is increased early. As a result, improving traction controllability becomes possible; if the threshold value TAX is increased, the time needed to increase the output of the assist motor 216 with respect to the manual drive force increases, making the suppression of a sudden start when starting to pedal possible.

The correction information map can have the rotational angle TA and the correction coefficient can be in a linear function-like relationship as shown by the line L1 in FIG. 3, or they can be an $n^{th}$-degree polynomial function curve, as shown by lines L2 and L3 in FIG. 3. The correction information map can be configured so that the correction coefficient is a prescribed numerical value instead of 0 when the rotational angle TA is 0 degrees, as shown by line L4 in FIG. 3. In the correction information map, the correction coefficient can change continuously according to the rotational angle TA, as shown by lines L1-L4 in FIG. 3, or the correction coefficient can change discontinuously in a stepwise manner according to the rotational angle TA, as shown by line L5 in FIG. 3. This kind of correction map is determined by experiment. The controller 4 is configured to comprise a plurality of correction information maps so that the operating unit 218 is able to set a plurality of correction information maps. The controller 4 can calculate the running assist force PX by a formula that is set in advance, rather than a correction control map.

The controller 4 controls the running assist force PX so that, when the manual drive force is reduced, the decrease in the running assist force PX is delayed with respect to this reduction in the manual drive force as the second correction operation. Specifically, the controller basically causes the assist motor 216 to output a base running assist force PA that is set according to the manual drive force as the running assist force PX when the first correction operation and the second correction operation are not being conducted. Then, the controller 4 corrects the base running assist force PS when the manual drive force is reduced and causes the assist motor 216 to output the corrected base running assist force PA as the running assist force PX. This corrected base running assist force PA becomes equal to or greater than the base running assist force PA before correction. The controller delays the decrease in the running assist force PX with respect to the reduction in the manual drive force by this correction operation. Here, the base running assist force PA, which is set according to the manual drive force, and the temporal changes in the base running assist force PA are described.

Figure 4:
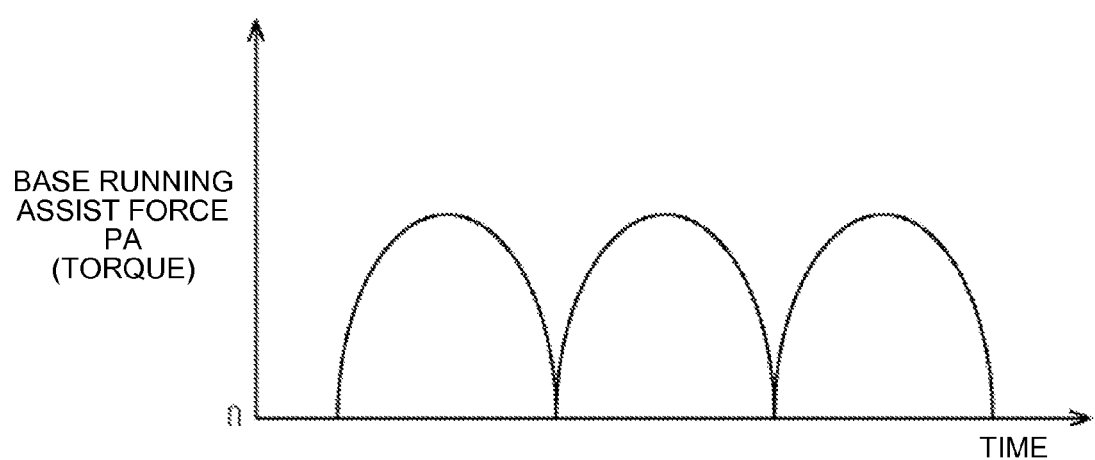
FIG. 4 is a graph showing a temporal change in a base running assist force.

FIG. 4 is a graph showing the temporal change in the base running assist force PA. The manual drive force becomes minimal when the pedal 211 is positioned at the top dead center or the bottom dead center; when the pedal 211 is positioned rotated 90 degrees from the top dead center or the bottom dead center, the manual drive force becomes the maximum. Since the base running assist force PA is set to a prescribed multiple of the manual drive force, the temporal change in the base running assist force PA will have a waveform such as shown in FIG. 4. When the controller 4 does not conduct a first correction operation and a second correction operation, the assist motor 216 will output the base running assist force PA.

The controller 4 causes the assist motor 216 to output the above-described base running assist force PA as the running assist force PX while correcting the base running assist force PA when the manual drive force is reduced; the controller causes the assist motor 216 to output the corrected base running assist force PA as the running assist force PX.

Specifically, the controller 4 converts the signal that is output by the first detector 2 into a discrete signal. That is, the controller 4 obtains information regarding the manual drive force that is detected by the first detector 2 at prescribed time intervals. Then, when a determination is made that the manual drive force that is detected by the first detector 2 is less than the manual drive force that was detected at a single moment prior, based on the discrete signal, the controller 4 determines that the manual drive force has been reduced.

Figure 5:
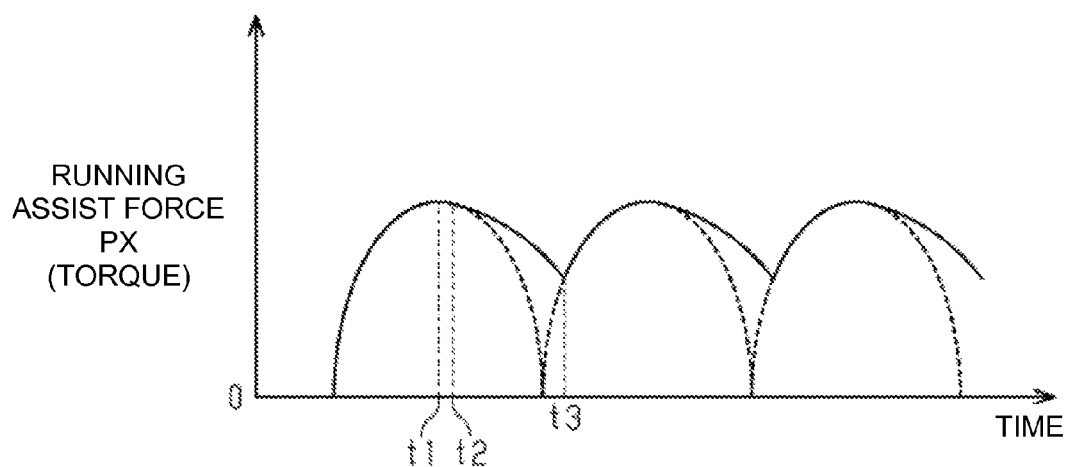
FIG. 5 is a graph showing a temporal change in a running assist force.

FIG. 5 is a graph showing the temporal change in the running assist force PX. The waveform shown by the solid line in FIG. 5 indicates the temporal change in the running assist force PX, and the waveform shown by the dashed line indicates the temporal change in the base running assist force PA. As shown in FIG. 5, the controller 4 determines that the manual drive force has been reduced at a time t2 after the time t1. Time t1 is a time at which the base running assist force PA displays the maximum value.

When a determination is made that the manual drive force has been reduced, the controller 4 delays the decrease in the running assist force with respect to the reduction in the manual drive force. Specifically, the controller 4 uses a primary low-pass filter to correct the base running assist force PA and obtains the running assist force PX. The reduction of the running assist force PX is delayed with respect to the decrease in the manual drive force, with the controller 4 correcting the base running assist force PA using a primary low-pass filter in this way.

Additionally, after starting the operation to correct the base running assist force PA, the controller 4 continues the operation to correct the base running assist force PA as long as the corrected running assist force PX is greater than the base running assist force PA before correction. That is, the controller 4 continues the operation to correct the base running assist force PA between time t2 and time t3 in FIG. 5. The controller 4 then stops the second correction operation when the base running assist force PA before correction becomes equal to or greater than the corrected running assist force PX at time t3.

The controller 4 also controls the delay in the reduction of the running assist force PX described above according to the rotational state of the crank 212. In particular, regarding the time constant of the primary low-pass filter that is used for the correction operation described above, the controller 4 sets a time constant corresponding to the rotational state of the crank 212. The response speed of the assist motor 216 when the manual drive force is decreased increases as the time constant decreases, and the response speed of the assist motor 216 when the manual drive force is decreased also decreases as the time constant increases.

Specifically, in a first control state described below, the controller 4 sets the time constant to be greater as the rotational speed KA of the crank 212 increases or the rotation period of the crank 212 decreases. As a result, the delay in the reduction of the running assist force PX decreases as the rotational speed KA decreases or as the rotation period increases, and the delay in the reduction of the above-described running assist force PX increases as the rotational speed KA decreases or the rotation period decreases. In the first control state, the duration of the assisting force decreases as the rotational speed KA decreases, and generating an assisting force that is synchronized with the manual drive force becomes possible. The traction controllability during low rotational speed KA traveling thereby improves.

Additionally, in a second control state described below, the controller 4 sets the time constant to be smaller as the rotational speed KA of the crank 212 increases or as the rotation period of the crank 212 decreases. As a result, the delay in the reduction of the running assist force PX decreases as the rotational speed KA increases or as the rotation period decreases. In the second control state, the time constant decreases as the rotational speed KA increases, that is, as the traveling speed becomes higher, so that the duration of the assisting force, that is, the time needed to drive the assist motor 216, decreases, making the consumption of power more difficult. Consequently, increasing the cruising distance in a high-speed range becomes possible. Also, in the second control state, the time constant increases as the rotational speed KA decreases, that is, as the traveling speed becomes slower, so that the duration of the assisting force increases, and suppressing a reduction in the vehicle speed becomes possible.

Figure 6:
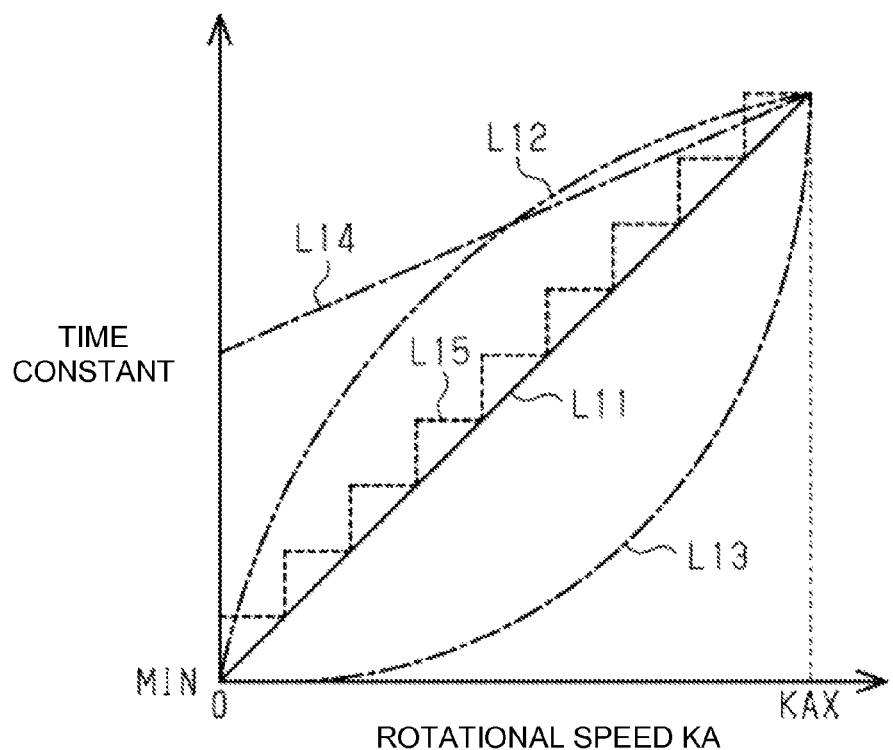
FIG. 6 is a time constant map showing a relationship between a time constant and cadence in a first control state.
Figure 7:
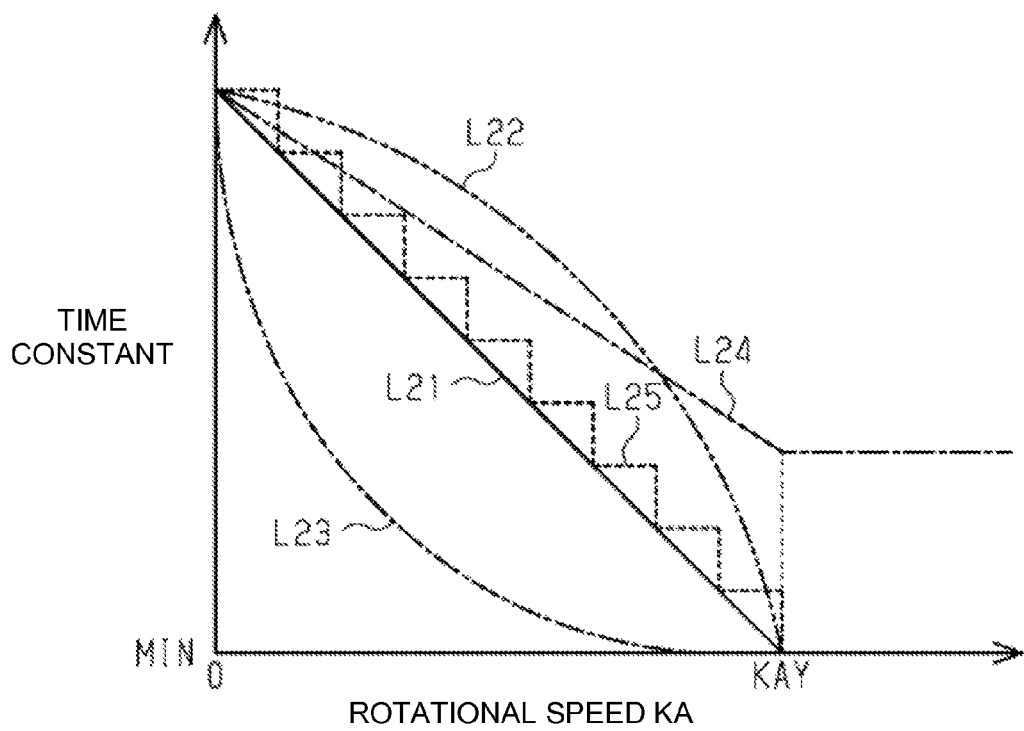
FIG. 7 is a time constant map showing a relationship between a time constant and cadence in a second control state.

For example, the controller 4 stores a time constant map such as that shown in FIG. 6 and FIG. 7 and sets the time constant based on this time constant map. The time constant map shown in FIG. 6 is used in the first control state. The time constant map shown in FIG. 6 includes information that correlates the time constant and the rotational speed KA, where the time constant decreases as the rotational speed KA increases. Additionally, when the rotational speed KA is equal to or greater than a prescribed value KAX, the time constant is correlated to become the minimum value. That is, the controller 4 does not conduct a correction of the running assist force PX by the second correction operation when the rotational speed KA is equal to or greater than a prescribed value. Meanwhile, the value of one control cycle of the controller can be employed as the minimum time constant.

The time constant map shown in FIG. 7 is used in the second control state. The time constant map shown in FIG. 7 includes information that correlates the time constant and the rotational speed KA, where the time constant increases as the rotational speed KA increases. Additionally, when the rotational speed KA is equal to or greater than a prescribed value KAY, the time constant is correlated to become a maximum constant value. The controller 4 can also calculate a time constant corresponding to the rotational speed KA by a formula set in advance instead of using such a time constant map. The prescribed value KAY and the prescribed value KAX can match. The prescribed value KAY can also be different from the prescribed value KAX.

In the time constant map, the relationship between the time constant and the rotational speed KA can be a linear function relationship, such as that shown by the line L11 in FIG. 6, as well as the line L21 in FIG. 7; or this can be an $n^{th}$-degree polynomial function relationship, such as that shown by the lines L12 and L13 in FIG. 6, as well as the lines L22 and L23 in FIG. 7. Additionally, as shown by the line L14 in FIG. 6, the time constant can become a numerical value greater than the minimum when the rotational speed KA is 0. As shown by the line L24 in FIG. 7, the time constant can become a numerical value greater than the minimum when the rotational speed KA is a prescribed value KAY. The time constant map can be configured so that the time constant will continuously change according to the change in the rotational speed KA, as shown by the lines L11-L14 in FIG. 6 and the lines L21-L24 in FIG. 7, or this map be configured so that the time constant will change discontinuously in a stepwise manner according to the change in the rotational speed KA, as shown by L15 in FIG. 6 and as shown by L25 in FIG. 7. This kind of time constant map is determined by experimentation. The controller 4 can comprise a plurality of time constant maps, and a plurality of time constant maps can be selected by the operating unit 218 or an external device 7.

As shown in FIG. 2, in addition to the assisting condition, the controller 4 can also selectively set a first control state and a second control state that have output characteristics of the assist motor 216 with respect to the manual drive force that are different from each other. The first control state is, for example, an off-road mode. The second control state is, for example, an on-road mode. The off-road mode is a mode suitable for traveling on a road surface with large temporal variations in the traveling load, such as rocky roads and dirt roads. The on-road mode is a mode suitable for traveling on a road surface with small temporal variations in the traveling load, such as paved roads. The temporal variation in the traveling load is the temporal change in the tangential force between the wheel and the road surface. The maximum values of the output of the assist motor 216 with respect to the manual drive force are the same for the first control state and the second control state.

The first control state and the second control state can be selectively set by the operating unit 218. The operating unit 218 comprises a first operating switch that corresponds to the first control state and a second operating switch that corresponds to the second control state. The controller 4 enters the first control state by operating the first operating switch, and the controller 4 enters the second control state by operating the second operating switch. The operating unit 218 can be configured to comprise one operating switch that is operated to alternately switch between the first control state and the second control state.

The communication unit 5 can also be provided to the bicycle control apparatus 1. In this case, the first control state and the second control state can be set via the communication unit 5. The communication unit 5 is configured to communicate with an external device 7. The external device 7 is, for example, a personal computer, a smartphone, etc. The communication unit 5 comprises a wired or a wireless interface and performs wired or wireless communication with the external device 7. When achieving a wired connection between the communication unit 5 and an external device, a connection port can be provided to a housing of the drive unit 219 or to the operating unit 218.

The controller 4 controls the output (the running assist force PX) of the assist motor 216 so that the response speed of the assist motor 216 with respect to changes in the manual drive force in the first control state will be faster than the response speed of the assist motor 216 with respect to changes in the manual drive force in the second control state when the bicycle crank 212 is rotated from a stopped state and/or when the rotational speed KA of the crank 212 is less than or equal to a prescribed first speed. The controller 4 differentiates the running assist force PX that the assist motor 216 outputs in the first control state and the running assist force PX that the assist motor 216 outputs in the second control state when the bicycle crank 212 rotates from a stopped state and/or when the rotational speed KA of the crank 212 is less than or equal to a prescribed first speed. In other words, the controller 4 differentiates that the output state of the assist motor 216 is the first control state and that the output state of the assist motor 216 is the second control state when the bicycle crank 212 rotates from a stopped state and/or when the rotational speed KA of the crank 212 is less than or equal to a prescribed first speed. Meanwhile, differentiating the output state means that cases are included in which the running assist force PX that is output when detecting the same manual drive force becomes a different size, depending on whether the output state is the first control state or the second control state; this can also include cases in which the same running assist force PX is output with respect to a part of the manual drive force.

In particular, the controller 4 controls the output of the assist motor 216 according to the first control state and the second control state, as described in the following (a) to (c).

(a) When the bicycle crank 212 is rotated from a stopped state, the controller 4 controls the output of the assist motor so that the response speed of the assist motor 216 when the manual drive force in the first control state increases will be faster than the response speed of the assist motor 216 when the manual drive force in the second control state increases.

(b) When the rotational speed KA of the crank 212 is less than or equal to a prescribed first speed, the controller 4 controls the output of the assist motor so that the response speed of the assist motor 216 when the manual drive force in the first control state decreases will be less than or equal to the response speed of the assist motor 216 when the manual drive force in the second control state decreases.

(c) When the rotational speed KA of the crank 212 exceeds a prescribed second speed, which is equal to or greater than the prescribed first speed, the controller 4 controls the output of the assist motor so that the response speed of the assist motor 216 when the manual drive force in the first control state decreases will be slower than the response speed of the assist motor 216 when the manual drive force in the second control state decreases.

Figure 8:
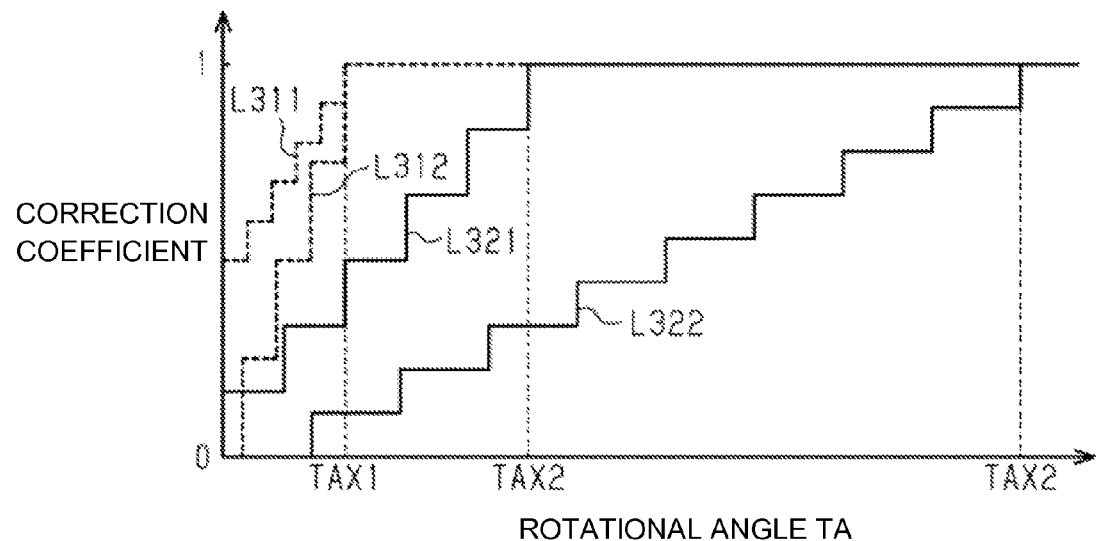
FIG. 8 is a correction coefficient map showing an association between a correction coefficient and a rotational angle in a first control state and a second control state.

In order to control the output of the assist motor 216 as described in (a) above, the controller 4 switches the correction information map or the formula that is used for the first correction operation between when in the first control state and the second control state. The controller 4 uses, for example, a correction information map such as that shown in FIG. 8 in the first correction operation. The dotted line L311 in FIG. 8 shows a correction information map that is used in the first correction operation when in the first control state. The solid line L321 in FIG. 8 shows a correction information map that is used in the first correction operation when in the second control state. In the first control state, the correction coefficient is set to be 1 when the rotational angle TA reaches a first rotational angle TAX1, which is the threshold value TAX. The first rotational angle TAX1 is, for example, 30 degrees. In the second control state, the correction coefficient is set to be 1 when the rotational angle TA reaches a second rotational angle TAX2, which is the threshold value TAX. The second rotational angle TAX2 is, for example, 60 degrees or 720 degrees. The first rotational angle TAX1 is smaller than the second rotational angle TAX2.

The controller 4 can switch the correction information map or the formula that is used in the first correction operation according to the traveling speed ZA of the bicycle 201. In this case, the controller 4 controls the output of the assist motor 216 so that the response speed of the assist motor 216 when the manual drive force increases will be faster when the traveling speed ZA is equal to or greater than a prescribed speed, as compared to when the traveling speed ZA is less than or equal to the prescribed speed.

For example, in the first correction operation in the first control state, when the traveling speed ZA is less than or equal to a prescribed speed ZX, the controller 4 uses a correction information map such as that shown by the dotted line L311 in FIG. 8; when the traveling speed ZA is less than or equal to the prescribed speed ZX, the controller 4 uses a correction information map such as that shown by the dotted line L312 in FIG. 8. In the correction information map of FIG. 8, if the traveling speed ZA is less than or equal to the prescribed speed ZX, the correction coefficient is set to be 1 when the crank 212 is rotated, for example, 30 degrees, from a stopped state. With the correction information map shown by the dotted line L311 and the correction information map shown by the dotted line L312, the first rotational angle TAX1 at which the correction coefficient becomes 1 will be the same. However, with respect to the rotational angle TA until the correction coefficient becomes 1, the correction coefficient will be larger in the correction information map shown by the dotted line L312 than in the correction information map shown by the dotted line L311.

For example, in the first correction operation in the second control state, when the traveling speed ZA is less than or equal to a prescribed speed ZX, the controller 4 uses a correction information map such as that shown by the solid line L321 in FIG. 8; when the traveling speed ZA is less than or equal to the prescribed speed ZX, the controller 4 uses a correction information map such as that shown by the solid line L322 in FIG. 8. In the correction information map of FIG. 8, if the traveling speed ZA is less than or equal to the prescribed speed ZX, the correction coefficient is set to be 1 when the crank 212 is rotated, for example, 60 degrees, from a stopped state.

For example, 3 km per hour is selected as the prescribed speed ZX. When the crank 212 is rotated from a stopped state when the traveling speed ZA is less than or equal to the prescribed speed ZX, the state is assumed to be one in which the bicycle 201 has started to move from a stopped state or a substantially stopped state. When the crank 212 is rotated from a stopped state when the bicycle 201 exceeds a prescribed speed ZX, the assumption can be that the bicycle 201 is in a coasting state. Starting the output of the assist motor 216 according to the running state of the bicycle 201 is possible with the controller 4 changing the correction information map.

When the bicycle crank 212 is rotated from a stopped state, if the crank is rotated at the same speed by applying the same manual drive force to the crank, the output of the assist motor 216 will be faster and greater when in the first control state, as compared to when in the second control state. That is, the response speed of the assist motor increases.

Figure 9:
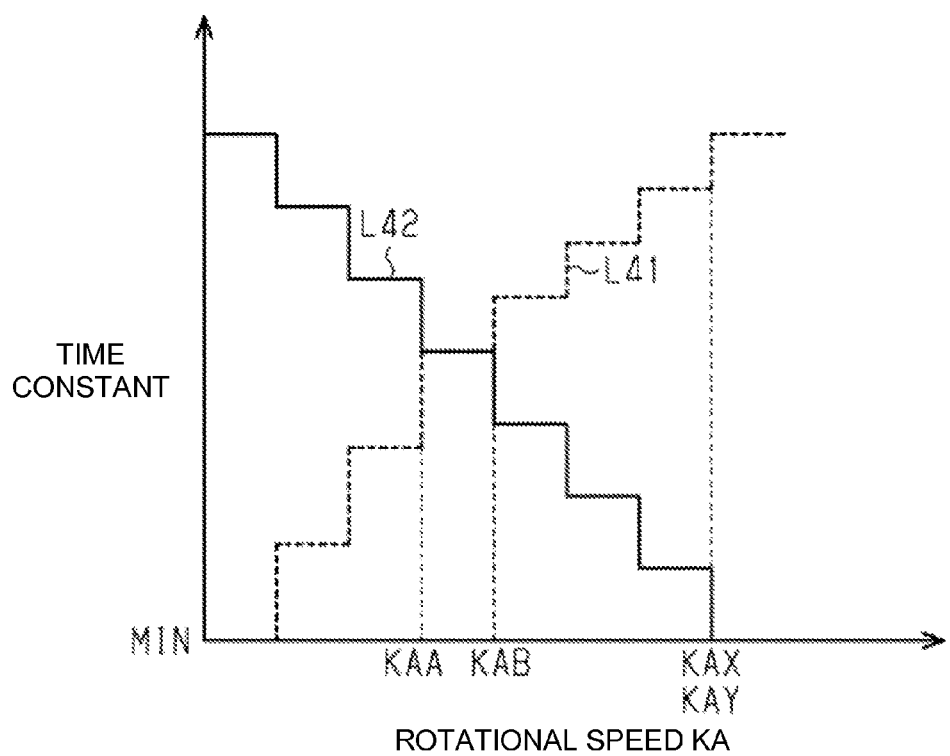
FIG. 9 is a graph showing a relationship between time constant and cadence in a first control state and a second control state.

In order to control the output of the assist motor 216 as described in (b) and (c) above, the controller 4 switches the correction information map or the formula that is used for the second correction operation between when in the first control state and the second control state. The controller 4 uses, for example, a correction information map such as that shown in FIG. 9 in the second correction operation. The dotted line L41 in FIG. 9 shows a correction information map that is used in the second correction operation when in the first control state. The solid line L42 in FIG. 9 shows a correction information map that is used in the second correction operation when in the second control state. In the example shown in FIG. 9, regardless of when in the first control state or the second control state, if the time constant becomes the same within a prescribed rotational speed KA range (KAA-KAB). The prescribed rotational speed KA range is, for example, 50 rpm-60 rpm. In the example shown in FIG. 9, the rotational speed KAA is a prescribed first speed, and the rotational speed KAB is a prescribed second speed.

Figure 10:
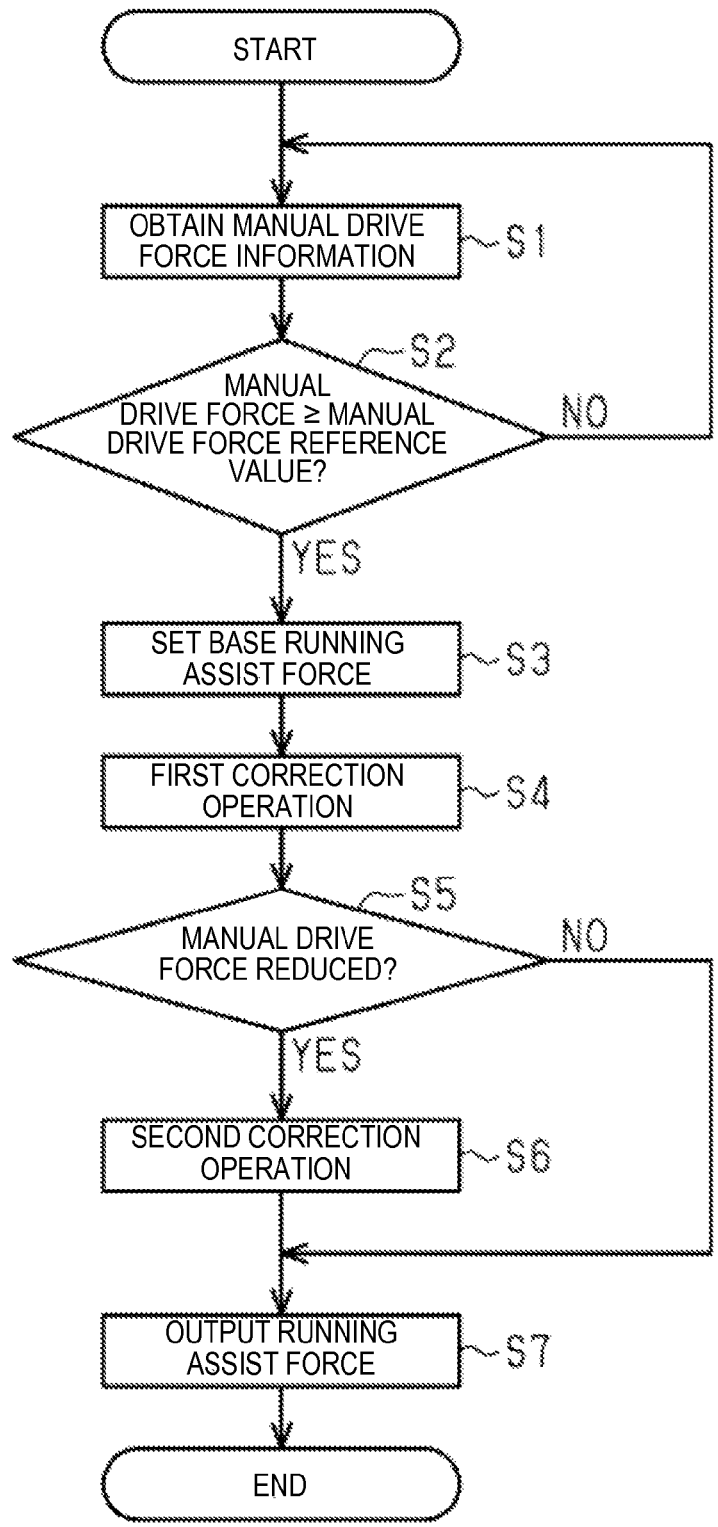
FIG. 10 is a flowchart showing a control operation that is executed by the bicycle control apparatus in accordance with the illustrated embodiment.

Next, the operation of the bicycle control apparatus 1 described above will be explained, with reference to FIG. 10. FIG. 10 is a flow chart that illustrates a control operation executed by the bicycle control apparatus 1.

When power is supplied to the bicycle control apparatus 1, the operation proceeds to step S1 in FIG. 10, and the controller 4 obtains information regarding the manual drive force that is detected by the first detector 2. Specifically, the controller 4 obtains information regarding the torque that is detected by the first detector 2.

Next, the operation proceeds to step S2, and the controller 4 determines whether or not the manual drive force is equal to or greater than the manual drive force reference value. Specifically, the controller 4 determines whether or not the torque is equal to or greater than a torque reference value, based on the obtained information regarding the torque. Meanwhile, while not particularly limited, this torque reference value can be made to be, for example, equal to or greater than 7 N·m and less than or equal to about 10 N·m. The controller 4 proceeds to the operation of step S1 when a determination is made that the manual drive force is less than the manual drive force reference value.

If a determination is made in step S2 that the manual drive force is equal to or greater than the manual drive force reference value, the controller 4 proceeds to step S3. In step S3, the controller 4 sets the base running assist force PA. Specifically, the controller 4 sets a base running assist force PA corresponding to the manual drive force.

Next, the first correction operation is performed in step S4. The controller 4 corrects the base running assist force PA according to the angle (the rotational angle TA) of the crank 212 from the stopped state, using a correction coefficient that corresponds to the control state that is set or that is selected. The controller 4 does not correct the base running assist force PA when the angle of the crank 212 from the stopped state becomes equal to or greater than a threshold value TAX.

Next, the operation proceeds to step S5, and the controller 4 determines whether or not the manual drive force is decreasing. If a determination is made in step S5 that the manual drive force is decreasing, the controller 4 proceeds to step S6.

In step S6, the controller 4 performs the second correction operation. The controller 4 corrects the base running assist force PA (the running assist force PX) that was corrected in step S4 or the base running assist force PA that has not been corrected using a time constant that corresponds to the control state that is set or that is selected and then proceeds to step S7. If a determination is made in step S5 that the manual drive force is not decreasing, the controller 4 proceeds to step S7.

In step S7, the controller 4 controls the assist motor 216 based on the base running assist force PA (the running assist force PX) that was corrected in step S4 and step S6, the base running assist force PA (the running assist force PX) that was corrected in step S4, or the base running assist force PA that has not been corrected. When step S7 has been completed, the operation returns to step S1 and continues to execute the operation of the flowchart until the supply of power to the controller 4 is interrupted.

The bicycle control apparatus 1 performs the following actions and obtains the following effects.

(1) The demand on the assist motor 216 differs depending on the traveling conditions of the bicycle 201, for example, between when the bicycle 201 is traveling on-road and when traveling off-road. For this reason, a control of the assist motor 216 that corresponds to the traveling conditions of the bicycle 201 is required.

The controller 4 is able to control the assist motor 216 by selectively setting the first control state and the second control state. As a result, controlling the assist motor 216 corresponding to the traveling conditions of the bicycle 201 is possible.

(2) When the rotational speed KA is less than or equal to a prescribed first speed, the controller 4 controls the output of the assist motor 216 so that the response speed of the assist motor 216 with respect to changes in the manual drive force in the first control state will be faster than the response speed of the assist motor 216 with respect to changes in the manual drive force in the second control state.

Accordingly, in the first control state, driving the assist motor 216 with respect to the manual drive force, good tracking is possible. For this reason, for example, when trying to climb over an obstacle while traveling off-road, if the manual drive force is increased, the output of the assist motor 216 is immediately increased; when the manual drive force is decreased, the output of the assist motor is immediately decreased. Accordingly, the traction controllability is improved. Additionally, when the manual drive force is decreased, the output of the assist motor 216 and the output time can be reduced, so that the power consumption can be reduced. On the other hand, in the second control state, the variation of the torque by the assist motor 216 is reduced. For this reason, the discomfort that is caused by a fluctuation in the assisting force when traveling on a flat paved road is likely to be imparted on the rider.

(3) When the crank 212 is rotated from the stopped state, that is, when in an area in which the rotational angle TA is small, the controller 4 controls the output of the assist motor 216 so that the response speed of the assist motor 216 with respect to the changes in the manual drive force in the first control state will be faster than the response speed of the assist motor 216 with respect to the changes in the manual drive force in the second control state. That is, the period during which the base running assist force PA is corrected to a running assist force PX that is less than the base running assist force PA will be shorter when in the first control state as compared to when in the second control state.

Accordingly, in the first control state, the running assist force PX with respect to the manual drive force increases quickly to the base running assist force PA, so that, for example, the traction controllability improves when the bicycle 201 is traveling off-road. On the other hand, in the second control state, the running assist force PX with respect to the manual drive force slowly increases to the base running assist force, as compared to the first control state; as a result, there are cases in which discomfort that is imparted on the rider from, for example, the traveling speed ZA increasing rapidly at the time of starting to run the bicycle 201 is reduced.

(4) For example, a large amount of power (energy) is required when traveling off-road while maintaining the speed to a certain degree. There is a risk that simply increasing the upper limit torque set value in order to obtain a large amount of power will lead to an increase in the size and weight of the motor unit and the mechanism portion of the drive unit 216. Additionally, increasing the assist ratio, which is the ratio of the output of the assist motor with respect to the manual drive force, will consume more power. When the rotational speed KA exceeds a prescribed second speed, the controller 4 controls the output of the assist motor so that the response speed of the assist motor when the manual drive force in the first control state decreases will be slower than the response speed of the assist motor when the manual drive force in the second control state decreases. The reduction in the assisting force is thereby suppressed even if the manual drive force is reduced; as a result, increasing the power without changing the size and the weight of the drive unit 219 becomes possible, and effectively utilizing the electric power becomes possible.

Modified Embodiments

The specific forms that the bicycle control apparatus can take are not limited to the forms illustrated in the fifth embodiment. The bicycle control apparatus can take various forms that are different from the fifth embodiment. The modified example of the fifth embodiment shown below is one example of the various forms that the bicycle control apparatus, etc. can take.

The controller 4 performs the second correction operation after the first correction operation, but the controller 4 can perform the first correction operation after performing the second correction operation.

In the embodiment, the controller 4 can correct the manual drive force that is detected by the first detector 2 instead of correcting the base running assist force PA. That is, instead of directly correcting the base running assist force PA, the controller 4 can indirectly correct the base running assist force PA by correcting the manual drive force that is detected by the second detector 3.

The first detector 2 detects the torque that acts on the crankshaft 212A as the manual drive force but is not limited thereto. For example, the first detector 2 can detect the tensile force that acts on the chain 210 as the manual drive force or the force that acts on the axle of the rear wheel 207 or the drive force that acts on the frame 202 by manual force.

A configuration is used in which a supplemental drive force acts on the power transmission path by the assist mechanism 215, but the present invention is not limited thereto. For example, the configuration can be such that supplemental drive force acts on the chain 210 by the assist mechanism 215. Additionally, for example, the present bicycle control apparatus can also be applied to an electrically assisted bicycle comprising a front hub motor, that is, an electrically assisted bicycle in which the front wheel 206 comprises an assist mechanism. Besides the above, the present bicycle control apparatus can also be applied to an electrically assisted bicycle comprising a rear hub motor, that is, an electrically assisted bicycle in which the rear wheel 207 comprises an assist mechanism.

The controller 4 can perform the first correction operation using the travel distance or the travel time from when the crank 212 of the bicycle 201 starts to rotate, instead of the rotational speed KA.

In the map shown in FIG. 9, when the rotational speed KA is greater than the rotational speed KAB, maintaining the line L42 at a time constant of a constant value, for example, the time constant at the time of rotational speed KAB, is possible. In this case, in the second control state, variation of the torque is suppressed even in a high-speed range. Consequently, the discomfort that is caused by a fluctuation in the torque is less likely to be imparted on the rider, even in a high-speed range. Additionally, maintaining a constant traveling speed ZA even in a high-speed range becomes easier.

The controller 4 executes all of the controls of (a), (b), and (c), but the configuration can be such that the controller 4 executes at least one control from among (a), (b), and (c). Additionally, the configuration can be such that the operating unit 218 and/or the external device 7 selects controls from (a), (b), and (c) to be executed by the controller 4.

The response speed of the assist motor 216 can be made to be adjustable by the operating unit 218 or the external device 7. In this case, the correction coefficient and the time constant can be selected or set by the operating unit 218 or the external device 7. As a result, controlling the assist motor 216 according to the preference of the rider becomes possible.

The controller 4 is set to be able to change the assisting condition via an operation of the operating unit 218, but the assisting condition can be made to be unchangeable. In this case, setting a running assist force PX that is a preset multiple of the manual drive force as the base running assist force PA is possible.

The controller 4 sets a correction coefficient according to the rotational angle TA of the crank 212 when the crank 212 is rotated from a stopped position. However, the controller 4 can delay the increase in the running assist force PX with respect to an increase in the manual drive force regardless of the rotation of the crank 212 when the crank 212 is rotated from a stopped state. In this case, the controller 4 corrects the base running assist force PA using a primary low-pass filter. Changing the response speed of the assist motor 216 with respect to changes in the manual drive force is possible by delaying the increase in the running assist force PX with respect to the increase in the manual drive force.

The controller 4 can be configured (i.e., programmed) to not correct the base running assist force PA when the crank 212 is rotated from the stopped position in the first control state. Additionally, the controller 4 can be configured (i.e., programmed) to not correct the base running assist force PA when less than or equal to the first traveling speed in the first control state. In this case, the assist motor 216 can respond more directly to the manual drive force.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control apparatus comprising:
a controller configured to control an output of an assist motor in response to a manual drive force,
the controller being configured to selectively set a first control state and a second control state, in which output states of the assist motor with respect to the manual drive force are different from each other, and
the controller being configured to control the output of the assist motor so that a response speed of the assist motor with respect to changes in the manual drive force in the first control state will be faster than the response speed of the assist motor with respect to changes in the manual drive force in the second control state, upon determining at least one of a crank of a bicycle being rotated from a stopped state and a rotational speed of the crank being less than or equal to a prescribed first speed, the response speed being the time needed for the output of the assist motor to reach a base running assist force.

2. The bicycle control apparatus as recited in claim 1, wherein
the controller is further configured to control the output of the assist motor so that the response speed of the assist motor when the manual drive force is increased in the first control state will be faster than the response speed of the assist motor when the manual drive force is increased in the second control state, upon determining the bicycle crank is rotated from a stopped state.

3. The bicycle control apparatus as recited in claim 1 or 2, wherein the controller is further configured to control the output of the assist motor so that the response speed of the assist motor when the manual drive force is decreased in the first control state will be faster than the response speed of the assist motor when the manual drive force is decreased in the second control state, upon determining the rotational speed of the crank is less than or equal to a prescribed first speed.

4. The bicycle control apparatus as recited in in claim 1, wherein
the controller is further configured to control the output of the assist motor so that the response speed of the assist motor when the manual drive force is decreased in the first control state will be slower than the response speed of the assist motor when the manual drive force is decreased in the second control state, upon determining the rotational speed of the crank exceeds a prescribed second speed, which is greater than or equal to a prescribed first speed.

5. The bicycle control apparatus recited in claim 1, further comprising
an operating unit configured to he attached to a bicycle, the controller being further configured to selectively set the first control state and the second control state with the operating unit.

6. The bicycle control apparatus as recited in claim 5, wherein
the controller is configured to adjust the response speed in response to operation of the operating unit.

7. The bicycle control apparatus as recited in claim 1, further comprising
a communication unit configured to communicate with an external apparatus, the controller being further configured to selectively set the first control state and the second control state with the external apparatus.

8. The bicycle control apparatus as recited in claim 7, wherein
the controller is configured to adjust the response speed in response to an input from the external apparatus.

9. A bicycle control apparatus comprising:
a controller configured to control the output of an assist motor in response to a manual drive force,
the controller being configured to selectively set a first control state and a second control state, in which maximum values of the output of the assist motor with respect to the manual drive force are the same, and in which the output states of the assist motor with respect to the manual drive force are different from each other, and
the controller controls the output of the assist motor so that a response speed for the output of the assist motor with respect to the manual drive force in the first control state will be different from the response speed for the output of the assist motor with respect to the manual drive force in the second control state, upon determining at least one of a crank of a bicycle being rotated from a stopped state and a rotational speed of the crank being less than or equal to a prescribed first speed, the response speed being the time needed for the output of the assist motor to reach a base running assist force.

10. The bicycle control apparatus as recited in claim 9, wherein
the controller is configured to reduce the output of the assist motor until a rotational angle of the crank reaches a first prescribed value, when the crank is rotated from a stopped state in the first control state, and reduce the output of the assist motor until the rotational angle of the crank reaches a second prescribed value, which is greater than the first prescribed value, upon determining the crank is rotated from a stopped state in the second control state.

11. A bicycle control apparatus for controlling a bicycle that has an assist motor, comprising:
a controller configured to control a running assist force that the assist motor outputs according to at least one of a rotational angle of a bicycle crank, based on a position of the bicycle crank at a point in time in which a running assist is initiated by the assist motor, a travel distance from a point in time at which the running assist is initiated, and a travel time from a point in time at which the running assist is initiated,
the controller being configured to selectively set a first control state and a second control state so that a response speed for the output of the assist motor with respect to the manual drive force are different from each other, and
the controller differentiates the running assist force that the assist motor outputs in the first control state and the running assist force that the assist motor outputs in the second control state, the response speed being the time needed for the output of the assist motor to reach a base running assist force.

12. A bicycle control apparatus for controlling a bicycle that has an assist motor, comprising:
a controller configured to control a running assist force that the assist motor outputs according to a manual drive force,
the controller being configured to control the running assist force so that a reduction in the running assist force with respect to a reduction in the manual drive force is delayed when the manual drive force is decreased and controls a delay in the reduction of the running assist force according to a rotation state of a crank,
the controller being configured to selectively set a first control state and a second control state so that a response speed for the output of the assist motor with respect to the manual drive force are different from each other, and
the controller being configured to differentiate the delay in the reduction of the running assist force in the first control state and the delay in the reduction of the running assist force in the second control state, the response speed being the time needed for the output of the assist motor to reach a base running assist force.

* * * * *